June 3, 1958 R. B. LAWRANCE ET AL 2,837,330
CONTROL APPARATUS
Filed May 21, 1956 3 Sheets-Sheet 1
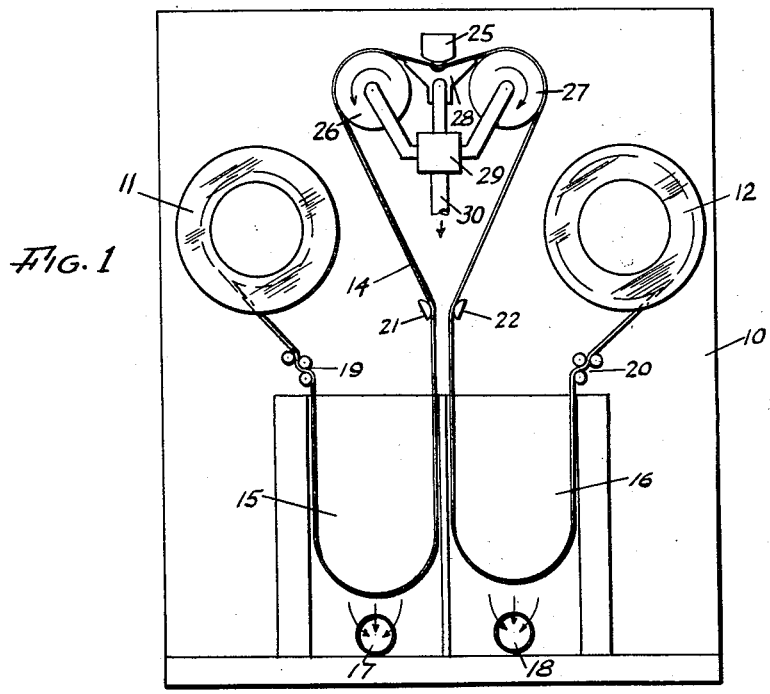
Fig. 1
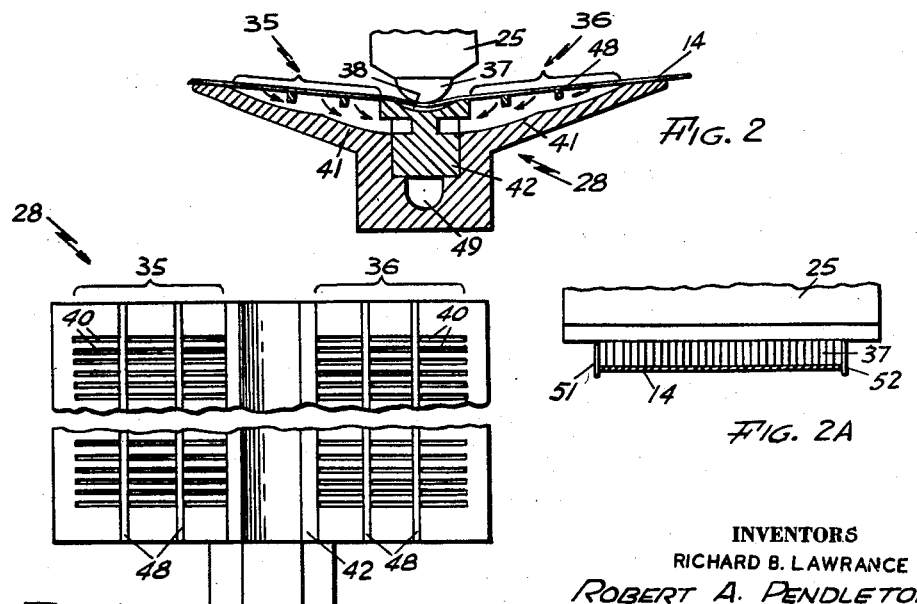
Fig. 2
Fig. 2A
Fig. 3
INVENTORS
RICHARD B. LAWRANCE
ROBERT A. PENDLETON
BY Henry L. Hanson
ATTORNEY

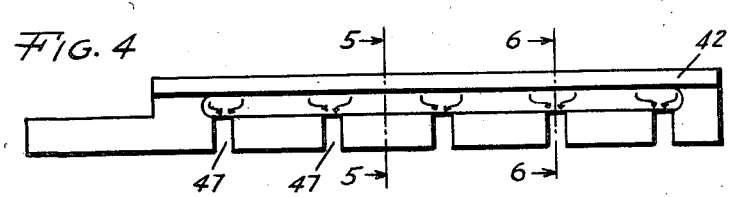
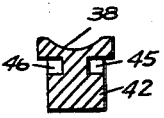
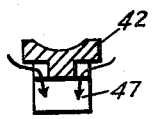

June 3, 1958   R. B. LAWRANCE ET AL   2,837,330
CONTROL APPARATUS

Filed May 21, 1956   3 Sheets-Sheet 3

INVENTORS
RICHARD B. LAWRANCE
ROBERT A. PENDLETON
BY Henry L. Hanson
ATTORNEY

United States Patent Office 2,837,330
Patented June 3, 1958

2,837,330

CONTROL APPARATUS

Richard B. Lawrance, Winchester, and Robert A. Pendleton, Dedham, Mass., assignors, by mesne assignments, to Minneapolis-Honeywell Regulator Company, a corporation of Delaware Application May 21, 1956, Serial No. 586,022

14 Claims. (Cl. 271—2.3)

A general object of the present invention is to provide a new and improved apparatus for controlling the movement of a flexible record storage member such as a tape. More specifically, the present invention is concerned with an improved apparatus for regulating the movement of a flexible record tape by means of a pneumatic assembly which is adapted to start and stop the movement of the record tape smoothly and in a minimum of time.

In the field of informational data processing, it is frequently desirable to store data or information on elongated tapes, such as a tape having a magnetizable surface wherein the data can be recorded by means of electrical impulses on the surfaces of the tape. The information which has been stored on the tape is conveniently read into and read out of the tape by means of an electromagnetic head or heads which may be designated as informational transfer heads. These heads are placed directly adjacent to the tape and effect the desired transfer of information from the associated data processing equipment to the tape and back again.

The information which is stored on the tape is conveniently recorded as discrete groups of magnetic impulses, commonly called informational blocks. For recording these impulses the tape is caused to move past the transfer head at a substantially uniform velocity, and a suitably varying electric current is supplied to the transfer head. For reading impulses back from the tape the tape is caused to again move past the head at a substantially uniform velocity and in either direction as convenient, the output of the transfer head being connected to the associated data processing equipment. Since the associated data processing equipment frequently requires information to be furnished a block at a time and since these blocks generally cover a relatively short space on the length of the tape, it is essential that the tape be brought up to speed in a very short time interval and over a very short length of tape. Further it must be possible to bring the tape to rest smoothly, consistently, and in a minimum of time and distance.

When the tape is being started and stopped frequently and is subjected to high accelerations and decelerations, there is a tendency for the tape to be deflected and twisted from its normal path of travel; if such occurs, there is an accompanying loss or garbling of information so as to render the use of the tape impractical.

It is therefore a more specific object of the present invention to provide a new and improved apparatus for rapidly starting and stopping a record tape without deflecting the tape from its normal path of travel with respect to an information transfer head.

The foregoing object of the present invention is achieved by a novel combination of a pair of pneumatic driving capstans and a pneumatic brake. The two capstans are continuously rotated in opposite directions and the brake is a stationary member.

Each of the driving capstans and the brake are formed with perforations in the surface thereof and with an air passage communicating therewith. The tape whose movement is to be controlled passes over the surface where the perforations are located. When it is desired to have a particular surface act on the tape, a pneumatic pressure differential is caused to act on the tape in such a manner as to cause the tape to move into engagement with the surface. This pressure differential may be created in many ways such as by applying, for example, a subatmospheric pressure to the perforations by way of the air passage.

This reduced pressure, applied adjacent to one surface of the tape acts in conjunction with the atmospheric or other pressure applied to the other surface of the tape to move the tape into engagement with the perforated surface of the capstan or brake.

The capstans and the brake are adapted to be activated selectively by means of a pneumatic switching block which will create a pressure differential on a selected unit to cause it to be effective to act upon the tape to cause it to move in a desired direction or to stop the movement. In the present arrangement, the surfaces of the driving capstans and the brake are formed in a unique manner which enhances their ability to control the movement of the tape without causing undesirable lateral deflection of the tape or without producing undesirable wear on the tape. This unique formation of the surfaces of the tape insures that there will be suitable clutching action over selected portions of the surfaces and this clutching action will release rapidly, substantially simultaneously, and uniformly over the surface of the tape when it is so desired. This is achieved by a surface slotting arrangement wherein a plurality of slots are cut in the surface of the member which is to be activated. Further, there is incorporated in this combination a unique air flow distributing member which insures that all of the slots across the surface, which are activated at the same time, are effectively activated with the same pressure differentials at the same instant.

It is therefore a further more specific object of the invention to provide a new and improved pneumatically actuated tape movement controlling apparatus having an active surface comprised of a plurality of parallel tapered grooves cut in the surface thereof and adapted to be equally and uniformly activated by a pneumatic switching means.

Still another more specific object of the invention is to provide a new and improved record tape movement controlling apparatus comprising a pneumatically activated surface having a plurality of parallel grooves cut in the surface thereof and parallel to the path of travel of the tape with an air distributing member positioned therein to insure that the pressure controlling differentials are equally effective over all surfaces of the activated portion.

The foregoing and other objects of the present invention will be apparent upon a consideration of the claims and of the following description and drawings of a preferred embodiment of the invention.

Of the drawings:

Figure 1 is a diagrammatic showing of a tape transfer apparatus incorporating the present invention;

Figure 2 is an end sectional view of the brake used in the present invention in combination with an information transfer head;

Figure 2A is a side view of the information transfer head;

Figure 3 is a plan view of the brake shown in Figure 2;

Figure 4 is a side view of an air flow distribution member used in combination with the brake;

Figure 5 is a sectional view of the member shown in Figure 4 taken along the section lines 5—5.

Figure 6 is a sectional view of the member shown in Figure 4 taken along the section lines 6—6;

Figure 7 is a plan view of one of the driving capstans;

Figure 8 is a sectional view of one of the driving capstans;

Figure 9 is another sectional view of one of the driving capstans;

Figure 10 is a side view of an air distribution member used in combination with the capstan;

Figure 11 is a sectional view of Figure 10 taken along the section line 11—11;

Figure 12 is a sectional view of Figure 10 taken along the sectional line 12—12;

Figure 13:
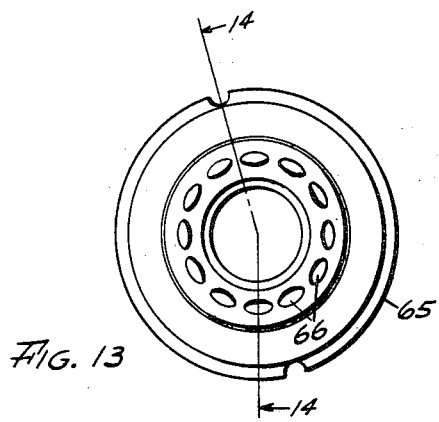
Figure 13 shows a commutator member for use with the capstans.

Referring first to Figure 1, the numeral 10 represents a panel or support upon which are mounted the elements used in the tape record controlling mechanism shown. Carried by the support 10 are a pair of supply reels 11 and 12 which are arranged to be reversibly driven by a suitable motor means, not shown. The reels 11 and 12 carry a tape 14 which may conveniently take the form of a magnetic tape upon which information may be stored by means of electrical impulses. The magnetic tape is preferably formed by placing a suitable iron oxide magnetic material between two layers of "Mylar" to form a sandwich type construction. The tape 14 is arranged to pass through a pair of loop chambers 15 and 16, said loop chambers being arranged to maintain the tape 14 under tension due to the action of the atmospheric pressure exerted on top of the tape and opposed by a reduced pressure under the tape created by suitable suction means connected to outlet conduits 17 and 18. The tape 14 is guided into the loop chambers 15 and 16 by suitable guide and tensioning pins 19 and 20 as well as by the guide pins 21 and 22. The guide pins 19 and 20 together with the force on the tape due to the pressure in the loop chamber, function to maintain the tape 14 under tension as it is fed from or onto the respective reels 11 or 12. This prevents the tape from forming pockets and bulging as it is wound on the reels 11 or 12.

An informational transfer head 25 is positioned to engage the tape 14. The movement of the tape 14 past the transfer head 25 is accomplished by a pair of contra-rotating capstans 26 and 27 which are of the pneumatic type. The braking of the tape 14 with respect to the transfer head 25 is accomplished by the brake member 28, also of the pneumatic type. The sudden application of a reduced pressure, to the capstans 26 and 27 or the brake 28 is selectively controlled by a suitable pneumatic switching block 29 having suitable control circuits for selectively communicating the sub-atmosphere pressure existing at the inlet conduit 30 to the block 29 and to the capstans 26 or 27, or the brake 28.

In considering the operation of the apparatus shown in Figure 1, it should first be noted that, whether for recording or reading purposes, it is desired to move the tape 14 past the information transfer head 25. The movement of the tape must be at some predetermined speed which is suitable for producing a transfer of information between the head and the tape. Such a speed may be, for example, 100 inches per second and the capstan diameter and rotation speed are chosen so as to produce this linear surface speed. The driving of the tape 14 past the head is accomplished by either one or the other of the driving capstans 26 and 27. If it is desired to drive the tape 14 from left to right past the reading head 25, the driving capstan 27 is actuated by the pneumatic switch assembly 29 so that a less than atmospheric pressure is applied to the capstan 27 and this draws the tape 14 into engagement with the capstan 27 so that the rotation of the capstan 27 is transferred to the tape and it is moved in the desired direction. Should it be desired to move the tape in the opposite direction, the capstan 26 will be actuated by the application of a less than atmospheric pressure thereto by the switch 29 and this will cause the tape 14 to be drawn against the capstan 26 and the tape will be moved in the direction that the capstan 26 is rotating.

When it is desired to stop the tape, the pneumatic switch 29 is caused to disconnect the sub-atmospheric pressure from the previously tape-driving capstan 26 or 27 and apply the sub-atmospheric pressure to the brake member 28. The brake member will in turn draw the tape against the face of the brake and cause the tape to stop.

The tape reels 11 and 12 are arranged to be driven by motor means, not shown, to maintain tape 14 within loop chambers 15 and 16. The depth of the tape in the respective loop chambers may be detected by suitable photoelectric means or by pressure sensing means which will indicate how far the tape extends into the loop chamber. When the tape is being driven from left to right, the tape 14 tends to fill up the chamber 16. As the tape extends further into the chamber 16, the reel 12 will be operated to pull a suitable length of tape out of the chamber up onto the reel. Independently, the reel 11 will be driven to add a suitable length of tape to chamber 15 when the tape rises in the chamber above a predetermined level. The reels 11 and 12 will function in the opposite manner when the tape is being driven in the opposite direction by the driving capstan 26.

Referring now to Figure 2, there is here shown the braking mechanism and the information transfer head in enlarged detail. The information transfer head 25 is shown positioned between two braking surfaces 35 and 36 with information transfer section 37 of the head 25 depressing the tape 14 into a depression 38 formed in the brake 28.

The braking surfaces 35 and 36 are formed in the manner shown in Figure 3. These surfaces are provided with a plurality of grooves 40 cut parallel to the direction of travel of the tape. During the machining of these grooves the air distributing member 42 and the transversely positioned bars 48 are not in place. The grooves are cut by a milling process and are tapered in depth increasing toward the center of the brake as shown by the contour 41. The face of the brake at the center thereof has a transverse slot cut across the same and in this slot is placed an air distributing member 42 which is shown in detail in Figures 4, 5, and 6. As shown in Figures 4, 5 and 6 the air distributing member 42 comprises a member having a pair of grooves 45 and 46 cut on the opposite sides thereof and arranged to communicate with a plurality of transverse slots 47 which are cut in the lower portion of the member 42. The air flow with respect to the air distributing member is shown by the arrows.

In operation, when it is desired to stop the moving tape, the air in the brake passages and in the space between the perforated brake face and the tape is drawn out through a suitable aperture 49 shown in Figure 2. The entire brake assembly is arranged so that when sub-atmospheric pressure is applied to the opening 49 by the action of the pneumatic switch 29, this reduced pressure will be communicated quickly and uniformly to the entire face of the braking surfaces, 35 and 36. This is achieved by the tapered form of the grooves in the face of the brake and by the operation of the air distributing member 42. The volume within the brake assembly is also kept at a minimum to further enhance the speed of communicating a change in pressure to the surfaces. Further, the passages leading to the brake are kept large enough to prevent restricting of the flow and small enough to minimize the volume of air to be moved.

When a low pressure or vacuum is supplied to the aperture 49 shown in Figure 2, the vacuum condition is rapidly transferred to the individual slots on the faces 35 and 36 and with the tape 14 being drawn thereacross, the action of the vacuum is to cause the atmospheric pressure to push the tape firmly against the braking surface and therefore arrest the motion of the tape.

It will be noted that when the tape is being driven past the brake 28, that the tape is deflected by the head section 37 into the depression 38 to insure that the tape will be making good contact with the head and therefore insure good reading of the signals stored on the tape. As soon as the vacuum is applied to the brake, the tape will be stopped with the braking action taking place on both sides of the head element 37. This in effect locks the tape in its position with respect to the head element 37 and there is no tendency for the tape to deflect or skew from its desired relationship with respect to the head element 37.

In order to increase the braking action of the surfaces 35 and 36, the individual grooves may be broken up by placing the transversely positioned bars 48 thereacross. The bars 48 function to subdivide the areas of vacuum application in such a manner as to provide a larger number of gripping positions. These bars further provide additional support for the tape.

As shown in Figure 2A, the information transfer head 25 may conveniently have a pair of guide members 51 and 52 on the opposite ends of the head section 37, shown in Figure 2A as a multiple channel transfer head. The guides 51 and 52 maintain the tape 14 centered with respect to the transfer elements of the head section 37.

Referring to Figure 7, there is here shown the detail of the driving capstans 27 and 26. A plan view is shown in Figure 7 while Figure 8 shows a cross-sectional view cut across the diameter thereof. Figure 9 shows a sectional view taken along the length of the capstan.

The capstan 27, as well as the capstan 26, is cylindrical in construction and is adapted to be continuously rotated. The surface of the capstan has cut therein a plurality of grooves 55, these grooves being milled into the surface and being parallel with the path of travel of the tape. At the center of the milled grooves and extending transversely across the surface of the capstan 27 are a plurality of slots 56, these slots being arranged to have inserted therein a suitable air distributing member of the type used on the brake number 28. This air distributing member is shown in Figures 10, 11, and 12. The air distributing member 58 comprises an elongated member having a pair of opposing slots 59 cut partially through the member along the length thereof and down the side thereof. The slots 60 are cut across the lower portion of the member 58 to provide a communication path from a passageway below the member up to the slots 59. There is an air distributing member 58 positioned in each of the slots 56 in the surface of the cylinder or capstan 27.

The slots 60 of the air distributing member are arranged to communicate with a further milled groove 61 shown in Figure 9 and running directly under the air distributing member to communicate with the slots 60. The slot 61 is milled in such a manner that at the outer edges it is shallow and it becomes deeper as it approaches the center of the capstan. At the center, there is a hole 62 drilled into the center portion of the capstan unit wherein a commutator element may be placed. This commutating element will be discussed below in connection with Figures 13 through 16.

In viewing Figure 9, it will be noted that when a less than atmospheric pressure is applied to the port or hole 62, the pressure reduction is communicated rapidly to the surface grooves by the air distributing member 58 by way of the slots 60. The air flow is shown by the arrows in Figures 9, 10 and 11. This distributing member thus insures equal and rapid pressure equalization in the particular segment which has the less than atmospheric pressure applied thereto. This makes the unit very sensitive and causes the tape, when adjacent to that selected segment to be quickly and uniformly drawn into engagement with the capstan.

The air distributing members 58 are retained in their position in the slots 56 in the surface of the capstan by means of clamp rings 63 and 64.

In order to cut down the amount of air handling equipment required with these driving capstans and to facilitate the control of the tape 14, it is essential that the individual segments of the capstan communicate with a commutator which is effective to activate only a selected portion of the capstan which engages the tape. It is generally desirable to limit the active section of the capstan to approximately 90° of the surface thereof. The need for this will be readily apparent when viewing Figure 1 noting that the tape 14 engages the capstans 26 and 27 only over a portion of the total surface. While the surface engages slightly greater than 90°, it is necessary only that about 90° of the surface area be active. If any greater surface area is active, the tape will have a tendency to follow the capstan around and not feed directly into the loop chambers.

Figure 14:
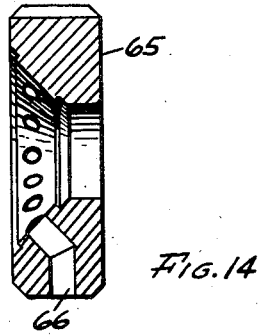
Figure 14 shows a sectional view of the commutator member shown in Figure 13.

The commutator assembly is shown in Figures 13 through 16. As shown in Figure 13, the first piece of the commutator is a rotating seal 65 having a plurality of ports 66 drilled through the surface thereof as shown in Figure 14. Each of the ports 66 is arranged to communicate with a corresponding port 62 within the capstan unit. The member 65 is arranged to be fit and keyed into the inner recess portion 67 of the capstan, as shown in Figure 9. This seal member 65 will thus rotate with the capstan as it is rotating.

Figure 15:
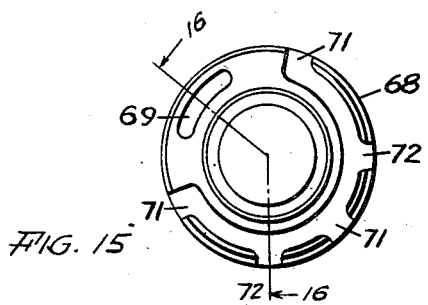
Figure 15 shows a further member incorporated in the commutator assembly.
Figure 16:
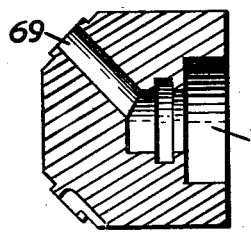
Figure 16 shows a sectional view of this commutator section.

The commutator also includes a stationary seal shown in Figures 15 and 16. This stationary seal 68 comprises a circular member having a port 69 drilled on the outer edge of this seal into an inner port 70 which is adapted to be connected to a suitable pneumatic switch. Spaced around the surface of the seal 68 are grooves 71 and communicating slots 72 which permit air to pass into the grooves 71 and thereby communicate with those ports in the capstan unit which are not communicating with the pneumatic supply port 69.

It will be noted that the port 69 is actually cut over a relatively small portion of the stationary seal 68. This portion is less than the 90° set forth above. In one embodiment, having twelve capstan segments, the seal was arranged with approximately 47° opening with an air tight seal extending approximately 30° on either side of the port 69. The effect of this is to apply a vacuum to at least two segments and to prevent any direct communication between atmosphere and the vacuum supply as the ports are switched into and out of the active section of the commutator.

As soon as the capstan rotates, the particular segment having the pressure locked therein will then communicate with atmospheric pressure and will be deactivated while another segment is being drawn into the active portion of the commutator. This arrangement insures that the optimum relationship of active surface to inactive surface is achieved in the vacuum switching of the individual commutator sections as the capstan is being rotated.

When the vacuum is released on any particular segment of the capstan, it is desirable that the atmospheric pressure reach all portions of that segment substantially instantaneously. This is achieved by the unique arrangement of the surface grooves as well as the groove 61 which serves to release the pressure condition on substantially all portions of the capstan segment at the same time. This prevents any objectionable rippling or flexing of the tape.

Figure 17:
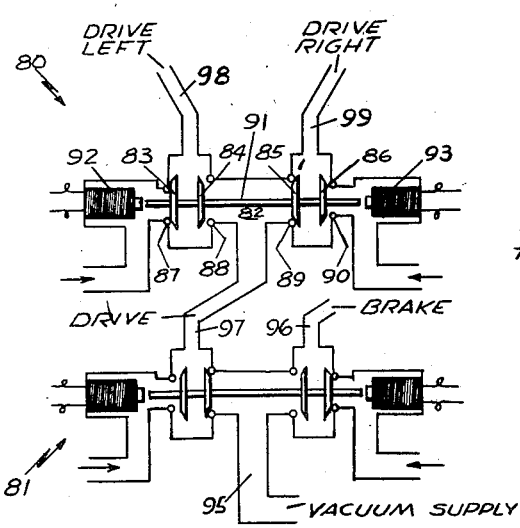
Figure 17 shows a poppet valve air flow switching system.

The pneumatic switch 29, shown in Figure 1, may take the form shown in schematic detail in Figure 17. This switch 29 comprises a pair of electromagnetically actuated poppet valve mechanisms 80 and 81. Each of the valve mechanisms 80 and 81 comprise a slide poppet valve assembly 82 having a plurality of valve port closing members 83, 84, 85, and 86. The valve members are arranged to co-operate with a plurality of valve seats 87, 88, 89 and 90. The valve members 83 to 86 are carried by a rod 91 which is suitably supported, by means not shown, for axial displacement. Positioned at either end of the rod 91 are a pair of electromagnets 92 and 93, the latter of which have moveable armatures which are adapted to strike the end of the rod 91 whenever the coil of the electromagnet is energized.

In operation, when the coil of the electromagnet 92 is energized, the armature thereof will strike the rod 91 and the poppet valve assembly 82 will switch from the position shown upon the drawing to the position where the valve members 84 and 86 are engaging their respective seats 88 and 90. Conversely, when the coil 93 is energized, the armature thereof will strike the rod 91 and the poppet valve assembly 82 will be switched back to the position shown upon the drawing. The switching action is very rapid and permits a rapid changing of the airflow passages within the switching assembly.

In terms of system operation, the poppet valve assembly is connected to a partial atmospheric pressure or vacuum supply by way of a conduit 95. This conduit will communicate through the switching member 81 to either a braking conduit 96 or to a drive conduit 97. The apparatus is shown in the drawing with the vacuum coupled directly through the switching element 81 to the brake conduit 96 so that the vacuum may be applied to the brake and the tape 14 will remain stationary. When the valve unit 81 is switched, the vacuum supply will then communicate with the drive conduit 97. The particular drive conduit which is active will depend upon the position of the poppet valve assembly 82. In the position shown, the drive conduit 97 will communicate with the drive left conduit 98. If the poppet valve assembly 82 is switched to the position opposite that shown, the drive right conduit 99 will be in communication with the vacuum input line 97.

In actual machine operation, the electromagnets of the switching assembly are connected to suitable electric controls which direct the driving of the tape to the left, to the right, or to stop.

In some forms of the invention, it has been found desirable that instead of opening the segments to atmospheric pressure after they have been activated, the assembly may be switched to have a positive pressure applied thereto. This insures an even more rapid release of the vacuum conditions in any one segment. Further, it has been found desirable in some instances that when a particular capstan unit is not active, a positive air pressure is applied thereto. The application of the positive pressure to the commutator section which is normally inactive serves to provide an air cushion to cause the tape 14 as it passes over the capstan to be lifted off of the capstan a very slight amount to considerably reduce the wear on the tape, either when the tape is stationary or when it is being driven in the opposite direction by the other capstan unit.

In like manner, should it be desired to cause the brake 28 of Figure 2 to release in a shorter time, a positive pressure may be applied to the port 49 and this positive pressure will break the vacuum quicker and also cause the tape to be effectively blown off of the braking surfaces 35 and 36. The air distributing member 42 serves to prevent the tape from being blown or moved in the vicinity of the information transfer head section 37 and substantially equalizes the pressure release on the surfaces 35 and 36.

The arrangement of the capstans 26 and 27, and the brake 28, acting on the same side of the tape 14 serve to limit the wear on the tape 14 to the back side thereof.

Thus, the protective coat of Mylar on the front of the tape may be very thin or eliminated. Further, the tapered edges of the slots do not tend to score the tape as occurs when other types of openings are used.

From the foregoing description, it will be readily apparent that there has been provided a new and improved tape control apparatus of the pneumatically actuated type which is particularly adapted for rapid changes in the position of the tape with respect to an informational transfer head and that these rapid changes may be achieved without introducing error into the informational transfer operation. While a preferred embodiment of the invention has been shown, it will be readily apparent to those skilled in the art that many changes may be made without departing from the spirit of the invention as set forth in the appended claims.

What is claimed is:

1. A pneumatically actuated apparatus for controlling the movement of an elongated flexible member comprising, in combination, a perforated member having a surface arranged to engage said flexible member, said perforated member having formed on the surface thereof elongated grooves which are parallel to the path of travel of said flexible member, a pneumatic passage connecting with each of said grooves, and means connected to said passage to create a pneumatic pressure therein to draw said flexible member into locking engagement with said perforated member.

2. Apparatus as defined in claim 1 wherein said perforated member is a rotatable cylinder.

3. Apparatus as defined in claim 1 wherein said perforated member is a stationary member used to brake the movement of said flexible member.

4. A pneumatically actuated apparatus for controlling the movement of a flexible tape comprising a member having a surface which is adapted to engage said tape, said tape engaging surface having cut therein a plurality of elongated grooves across said surface with each groove running parallel to the path of travel of said tape, an air flow passage formed within said member and communicating with each of said grooves, and an air flow distributing member centered on said elongated grooves and running transverse thereof to balance the air flow from the active portions of said grooves on either side of said air distributing member.

5. Apparatus as defined in claim 4 wherein each of said grooves in said member is tapered in depth from the outer edge thereof to said passage.

6. Apparatus as defined in claim 5 wherein said member is a moveable member adapted to have a vacuum applied thereto to drive said tape in the direction of movement of said member.

7. Apparatus as defined in claim 5 wherein said member is a stationary member adapted to have a pressure differential applied thereto to stop the movement of said tape.

8. A driving capstan for a flexible tape comprising a cylindrical member, means dividing the circumferential area of said member into a plurality of characterized segments comprising a plurality of elongated grooves each paralled to the path of surface travel of said member and positioned tranversely across the surface thereof, a separate passage communicating with the grooves of each segment, and a flow distributing member positioned in the grooves of each segment and extending transversely of said grooves to balance the flow of air between said passage and the active surface openings of said grooves on either side of said flow distributing member.

9. Apparatus as defined in claim 8 wherein said grooves are tapered in depth as they approach said flow distributing member.

10. A pneumatic brake for a flexible tape comprising a V-shaped member adapted to have the tape extend along the inner sides of the V, a plurality of grooves cut in the surface of each of said inner sides and each extending parallel with the path of travel of said tape within said V-shaped member, a central passage within said V at the lower portion thereof communicating with each of said grooves, and a fluid flow distributing member positioned within said passage to divide the flow between the grooves on either side thereof.

11. A pneumatic brake as defined in claim 10 wherein said grooves are each tapered toward said passage.

12. A pneumatic brake as defined in claim 10 wherein said grooves have a bar extending transversely thereof to break the length thereof into segments.

13. A pneumatic brake for a flexible tape comprising a hollow member having a tape engaging portion with a transverse groove extending thereacross at right angles to the path of travel of the tape and further having a pair of planar surfaces on opposite sides of said transverse groove, a further plurality of grooves cut through the planar surfaces to communicate with the hollow portion of said member, said grooves each extending parallel with the path of travel of the tape, a pneumatic passage in said member communicating with said plurality of grooves in the planar surfaces, and means positioned in said passage for balancing the pneumatic signals communicated to said plurality of grooves.

14. A pneumatic brake for a flexible tape comprising a hollow member having a tape engaging portion with a transverse groove extending thereacross at right angles to the path of travel of the tape and further having a pair of planar surfaces extending at an angle on opposite sides of said transverse groove, a further plurality of tapered grooves cut through each of the planar surfaces to communicate with the hollow portion of said member, said grooves each extending parallel with the path of travel of the tape, a pneumatic passage in said member communicating with said plurality of grooves in the planar surfaces, and means positioned in said passage for balancing the pneumatic signals communicated to said plurality of grooves.

References Cited in the file of this patent

UNITED STATES PATENTS

| | | |
|---|---|---|
| 1,655,688 | Carle | Jan. 10, 1928 |
| 2,714,840 | Bayrer et al. | Aug. 9, 1955 |
| 2,753,181 | Anander | July 3, 1956 |
| 2,778,634 | Gams et al. | Jan. 22, 1957 |